(12) United States Patent
Zhou et al.

(10) Patent No.: US 10,052,701 B2
(45) Date of Patent: Aug. 21, 2018

(54) C-TYPE TUBING CUTTER

(71) Applicant: Ridge Tool Company, Elyria, OH (US)

(72) Inventors: Qi Zhou, Shanghai (CN); Duan Wu, Shanghai (CN)

(73) Assignee: Ridge Tool Company, Elyria, OH (US)

( * ) Notice: Subject to any disclaimer, the term of this patent is extended or adjusted under 35 U.S.C. 154(b) by 0 days.

(21) Appl. No.: 15/291,401

(22) Filed: Oct. 12, 2016

(65) Prior Publication Data

US 2017/0173710 A1   Jun. 22, 2017

Related U.S. Application Data

(60) Provisional application No. 62/268,064, filed on Dec. 16, 2015.

(51) Int. Cl.
*B23D 21/08* (2006.01)
*B23D 21/04* (2006.01)

(52) U.S. Cl.
CPC ............ *B23D 21/08* (2013.01); *B23D 21/04* (2013.01)

(58) Field of Classification Search
CPC ......... B23D 21/06; B23D 21/08; B23D 21/10
USPC .................................. D8/60; 30/93–96, 102
See application file for complete search history.

(56) References Cited

U.S. PATENT DOCUMENTS

| | | | |
|---|---|---|---|
| 702,919 A * | 6/1902 | Boyd et al. ............. | B25B 13/16 30/102 |
| 911,107 A * | 2/1909 | Bartholomaus ........ | B23D 21/10 30/95 |
| 1,833,980 A * | 12/1931 | Thewes .................. | B23D 21/08 30/102 |
| 2,230,030 A * | 1/1941 | Finch ..................... | B23D 21/08 30/102 |
| 2,718,058 A * | 9/1955 | Arnold ................... | B23D 21/08 30/102 |
| 2,734,268 A * | 2/1956 | Grinling ................. | A01G 3/02 30/186 |
| 2,739,381 A * | 3/1956 | Petersen ................. | B23D 21/08 30/102 |
| 2,824,772 A | 2/1958 | Petersen | |
| 2,870,536 A * | 1/1959 | Lutsker .................. | B23D 21/08 30/102 |
| 3,335,492 A | 8/1967 | Spiro | |
| 3,408,738 A * | 11/1968 | Schade .................. | B23D 21/10 30/95 |
| 3,545,081 A * | 12/1970 | Butler .................... | B23D 21/08 30/102 |

(Continued)

FOREIGN PATENT DOCUMENTS

| | | | | |
|---|---|---|---|---|
| CA | 2331307 A1 | * | 2/2002 | ............. B23D 21/08 |
| EP | 0992311 A1 | * | 4/2000 | ............. B23D 21/08 |

(Continued)

OTHER PUBLICATIONS

European Search Report, dated Feb. 22, 2017; Application No. 16202453.3; 9 pages.

*Primary Examiner* — Jason Daniel Prone
(74) *Attorney, Agent, or Firm* — Mark E. Bandy; Rankin, Hill & Clark LLP

(57) ABSTRACT

C-type tubing cutters are described. The cutters include a cutting wheel that can be easily and quickly replaced. In many versions of the cutters, the cutting wheel can be replaced without disassembly of the housing and/or without the use of tools.

16 Claims, 4 Drawing Sheets

(56) References Cited

U.S. PATENT DOCUMENTS

| | | | | |
|---|---|---|---|---|
| 3,639,980 A | * | 2/1972 | Muse | B23D 21/08 30/102 |
| 3,795,051 A | | 3/1974 | Feamster, III | |
| 3,932,937 A | * | 1/1976 | Bastiansen | B23D 21/10 30/102 |
| 4,078,304 A | * | 3/1978 | Netzel | B23D 21/08 30/95 |
| 4,739,554 A | * | 4/1988 | Hytonen | B23D 21/08 30/101 |
| 4,831,732 A | | 5/1989 | Garton | |
| 4,847,997 A | * | 7/1989 | Petty | B23D 21/08 30/102 |
| 4,858,316 A | * | 8/1989 | Dubey | B23D 21/08 30/102 |
| 5,230,150 A | * | 7/1993 | Sperti | B23D 21/08 30/94 |
| 5,285,576 A | | 2/1994 | Taylor | |
| 5,581,886 A | * | 12/1996 | Sesser | B23D 21/08 30/102 |
| 5,688,085 A | * | 11/1997 | Watts | E05B 9/084 409/259 |
| 5,903,980 A | * | 5/1999 | Collier | B23D 21/08 30/102 |
| 5,943,778 A | * | 8/1999 | Alana | B23D 21/08 30/101 |
| 6,032,367 A | * | 3/2000 | Bonnette | B23D 21/08 30/102 |
| 6,065,212 A | * | 5/2000 | Lazarevic | B23D 21/04 30/101 |
| 6,095,021 A | * | 8/2000 | Epperson | B23D 21/04 82/113 |
| 6,357,119 B1 | * | 3/2002 | Acerra | B08B 1/00 15/104.04 |
| 6,393,700 B1 | * | 5/2002 | Babb | B23D 21/08 30/102 |
| 6,637,115 B2 | * | 10/2003 | Walsh | B23D 21/04 30/101 |
| 6,658,739 B1 | * | 12/2003 | Huang | B23D 21/08 30/96 |
| 7,013,567 B2 | * | 3/2006 | Myers | B23D 21/04 30/101 |
| D556,528 S | * | 12/2007 | Huang | D8/60 |
| RE40,461 E | * | 8/2008 | Hu | B23D 21/08 30/102 |
| 7,464,472 B2 | * | 12/2008 | Kangas | B23D 21/04 30/96 |
| D640,520 S | * | 6/2011 | Rampling | D8/60 |
| 8,266,991 B2 | * | 9/2012 | Thorson | B23D 21/04 30/101 |
| 8,413,336 B2 | * | 4/2013 | Chiu | B23D 21/08 30/102 |
| 8,573,099 B2 | | 11/2013 | Huang | |
| 8,601,697 B2 | * | 12/2013 | Whittaker | B26D 3/169 30/102 |
| D697,773 S | * | 1/2014 | Groten | D8/60 |
| D808,756 S | * | 1/2018 | Hyma | D8/60 |
| 2005/0086809 A1 | | 4/2005 | Myers | |
| 2007/0180701 A1 | * | 8/2007 | Hutt | B23D 21/08 30/95 |
| 2008/0060203 A1 | * | 3/2008 | Metcalf | B23D 21/08 30/96 |
| 2010/0088898 A1 | * | 4/2010 | Thorson | B23D 21/04 30/95 |
| 2011/0179649 A1 | * | 7/2011 | Park | B23D 21/04 30/95 |
| 2016/0008895 A1 | * | 1/2016 | Chen | B23D 21/08 30/102 |

FOREIGN PATENT DOCUMENTS

| | | | | |
|---|---|---|---|---|
| EP | 1195216 | | 4/2002 | |
| EP | 3181279 A1 | * | 6/2017 | B23D 21/08 |
| ES | 2017381 A6 | * | 1/1991 | B23D 21/08 |
| GB | 2288353 A | * | 10/1995 | B23D 21/08 |
| GB | 2455367 A | * | 6/2009 | B23D 21/08 |
| GB | 2489706 B | * | 12/2013 | B23D 21/08 |
| GB | 2537051 A | * | 10/2016 | B08B 9/021 |
| WO | WO 8603439 A1 | * | 6/1986 | B23D 21/08 |
| WO | WO 2017048986 A1 | * | 3/2017 | B23D 21/08 |

* cited by examiner

C-TYPE TUBING CUTTER

CROSS REFERENCES TO RELATED APPLICATIONS

The present application claims priority upon U.S. provisional patent application Ser. No. 62/268,064 filed Dec. 16, 2015.

FIELD

The present subject matter relates to C-type tubing cutters having a blade that can be easily and quickly changed.

BACKGROUND

A wide array of C-type tubing cutters are known in the art. Most cutters utilize a cutting implement which must be replaced after excessive use. Replacement of the cutting implement typically requires partial disassembly of the cutter and in many instances also requires the use of one or more tools. As will be appreciated, it is undesirable to disassemble such cutters as their components may become lost during the disassembly and/or re-assembly process. Also, it is undesirable to require other tools in order to install a new cutting implement because then a user must carry such tools or travel to a location where such tools are located.

Accordingly, a need exists for a C-type tubing cutter that does not require disassembly nor tools in order to change its cutting implement.

SUMMARY

The difficulties and drawbacks associated with previous approaches are addressed in the present subject matter as follows.

In one aspect, the present subject matter provides a handheld cutting tool comprising a housing defining a first outer face, a second outer face oppositely directed from the first face, a work region for receiving a workpiece to be cut and an axle slot. The slot is accessible along at least one of the first and second outer faces. The cutting tool also comprises at least one roller rotatably supported in the housing and accessible in the work region. The cutting tool additionally comprises a cutting wheel and axle assembly removably retained within the housing. The axle is disposed in the slot and positionable between a first end of the slot and a second end of the slot, opposite the first end.

In another aspect, the present subject matter provides a method of replacing a cutting wheel of a handheld cutting tool including (i) a housing defining a work region for receiving a workpiece to be cut and an axle slot, and (ii) a cutting wheel and axle assembly removably retained within the housing. The axle is disposed in the slot and positionable between a first end of the slot and a second end of the slot, opposite the first end. The method comprises removing the axle from the cutting wheel and the slot, thereby enabling separation of the cutting wheel from the housing. The method also comprises removing the cutting wheel from the housing. The method additionally comprises positioning another cutting wheel within the housing. The wheel defines a central bore sized to receive the axle. The wheel is positioned within the housing such that the bore is accessible through the slot. The method also comprises inserting the axle into the slot and the bore of the cutting wheel to thereby retain the cutting wheel within the housing.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter relates to handheld "C-type" tubing cutters. The tubing cutters feature a cutting wheel that can be replaced without disassembly of the housing and without any tools.

The tubing cutters generally include a removable pin which also serves as an axle for a cutting wheel. In certain embodiments of the present subject matter, the axle pin includes an enlarged head. The tubing cutters also include a slot in the housing within which the axle pin is positioned. In many embodiments of the present subject matter, the axle pin is slidably positionable within the slot. Replacement of the cutting wheel is performed by (i) removing the axle pin which thereby allows the cutting wheel to be removed, (ii) removing the cutting wheel, (iii) inserting a new cutting wheel in the cutter, and (iv) inserting the axle pin in the new wheel and in the slot of the cutter housing.

After insertion of the axle pin in the new or replacement wheel and in the housing of the cutter, the new wheel is retained with the housing. Next, a series of operations are performed to properly position the cutting wheel in the housing and relative to a work region defined by the housing.

Upon initially inserting the axle pin, the pin is inserted at one end of the housing slot. A user then begins a tube cutting operation by positioning a tube to be cut in the work region of the cutter. Contact between the cutting wheel and the tube occurs, and as the user urges the tube toward the center of the cutter in order to cut the tube, the axle pin and cutter wheel are moved along the slot toward an opposite end of the slot.

As the user rotates the cutter relative to the tube in order to cut the tube, the axle pin rotates about its axis such that the elongated rectangular shaped head of the pin extends over the slot. This serves to "lock" the axle pin and wheel within the tool. In addition, the axle pin and the cutter wheel move back toward the original or first end of the slot. It will be understood that instead of urging a tube into the work region and contacting the cutter wheel to move the wheel and axle pin within the slot and as described herein, it is also possible to grip or otherwise move the axle pin within the slot by using one's fingers. Thus, although use of a tube is desirable in many instances, such is not required.

Figure 1:
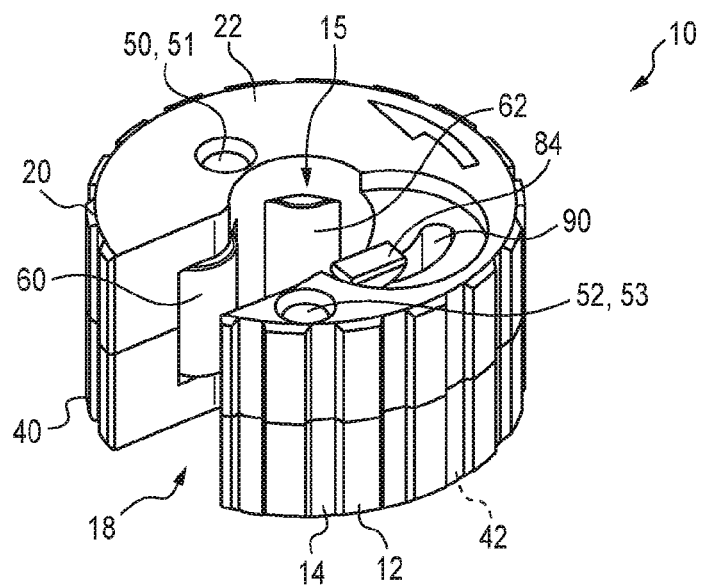
FIG. 1 is a perspective view of an embodiment of a C-type tubing cutter in accordance with the present subject matter.

FIG. 1 is a perspective view of an embodiment of a C-type tubing cutter 10 in accordance with the present subject matter. The tubing cutter 10 comprises two or more separable and interengaging first and second housing portions 20 and 40, respectively. The housing portions are configured such that upon engagement and contact with each other, they form a generally cylindrically shaped housing defining a first outer face 22 provided by the first housing portion 20, and a second outer face 42 provided by the second housing portion 40. The second face 42 is oppositely directed relative to the first face 22. The housing may also include one or more ridges 12 and/or depressions 14 extending between the faces 22 and 42 and disposed on or formed within a circumferential wall or region of the housing to promote gripping of the cutter 10. Although a two component cylindrical housing has been generally described, it will be appreciated that the present subject matter includes a variety of other shapes and/or configurations for the housing of the tubing cutter.

The cutter 10, and more particularly the housing portions 20 and 40, define a work region 15 which is sized and shaped to receive a tube, pipe, conduit or other workpiece to be cut. Typically, the work region extends between the faces 22 and 42 and is cylindrical in shape or substantially so. The work region 15 is also radially accessible by an access port 18. The access port 18 is also sized and shaped to enable a tube, pipe, conduit, or other workpiece to be positioned within the work region 15 of the cutter without having to access an end of the tube, pipe, conduit, or other workpiece.

Figure 2:
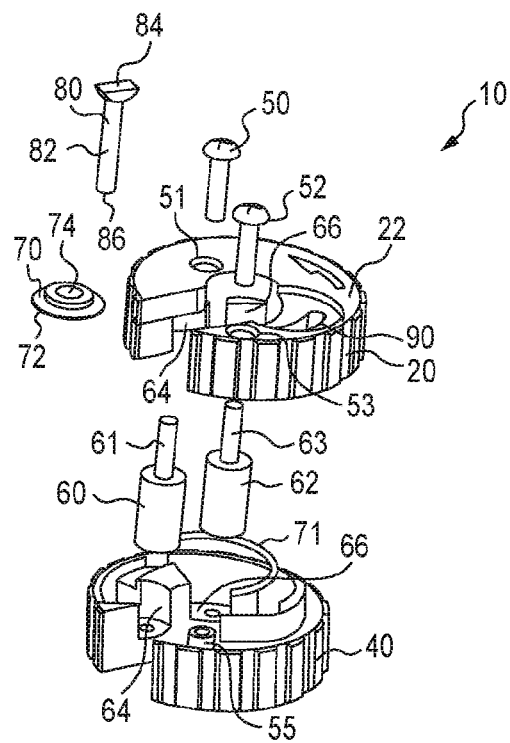
FIG. 2 is an exploded view showing various components of the cutter of FIG. 1.

The cutter 10 also comprises at least one roller 60 and in many embodiments, a pair of cylindrical rollers 60 and 62. The roller(s) such as rollers 60, 62, is rotatably affixed within the housing portions 20, 40 by associated axles 61 and 63. In the cutter version shown in FIGS. 1 and 2, the first roller 60 includes an axle 61. The roller 60 is received in a roller region 64 defined in the cutter housing. The second roller 62 includes an axle 63. The roller 62 is received in a roller region 66 defined in the cutter housing. The rollers 60 and 62 are at least partially accessible and exposed within the work region 15 of the cutter 10. It will be understood that that present subject matter is not limited to this particular assembly, and instead includes a range of variant assemblies and components for rotatably engaging one or more rollers in the housing of the cutter.

The cutter 10 also includes one or more fasteners such as fasteners 50, 52, for securing the housing portions 20 and 40 together. The fasteners 50, 52 are disposed in corresponding apertures in one or both of the housing portions such as for example, apertures 51 and 53 defined in the first housing portion 20. In many embodiments, the fasteners 50, 52 are in the form of threaded fasteners. Corresponding threaded receiving regions can be provided in the other housing portion such as the second housing portion 40. Thus, the housing portions are secured together by the first fastener 50 extending through the aperture 51 defined in the first housing portion 20 and being threadedly engaged in the corresponding receiving region (not shown) provided in the second housing portion 40; and the second fastener 52 extending through the aperture 53 defined in the second housing portion 40 and being threadedly engaged in a corresponding receiving region 55 provided in the second housing portion 40. It will be understood that the present subject matter cutters are not limited to this particular assembly and instead includes other arrangements, techniques, and/or components for securing the housing portions together.

The cutter 10 also includes a cutting wheel 70 and an axle pin 80. The cutting wheel 70 defines an outer circumferential cutting edge 72 and a central bore 74 for receiving the axle 80. The axle pin 80 defines a shaft 82 extending between an enlarged head end 84 and a distal end 86. In certain versions, the enlarged head 84 is rectangular shaped. The bore 74 and/or the shaft 82 are sized so that upon insertion of the axle pin 80 into the bore 74 of the wheel 70, the wheel 70 can rotate about the axle pin 80, to thereby form a wheel and axle assembly. As described in greater detail herein, the cutting wheel 70 is generally received within and disposed between the housing portions 20, 40. The cutting wheel 70 is at least partially accessible and exposed within the work region 15 of the cutter 10. The axle pin 80 is slidably disposed within an axle slot 90 defined in both of the first and second housing portions 20, 40. These and other aspects are described in greater detail herein.

The cutter 10 is assembled with or without the cutting wheel 70 and its axle pin 80. That is, the housing portions 20, 40 can be engaged together while generally enclosing and rotatably supporting the rollers 60, 62 by fasteners 50, 52 used to secure the resulting assembly together, with or without the wheel 70 and axle pin 80. After assembly of the housing, the wheel 70 and axle pin 80 can be incorporated therewith using the same procedure as when replacing a cutting wheel. The cutter 10 also comprises a spring 71 that biases the wheel 70 to a particular position as described in greater detail herein.

Figure 3:
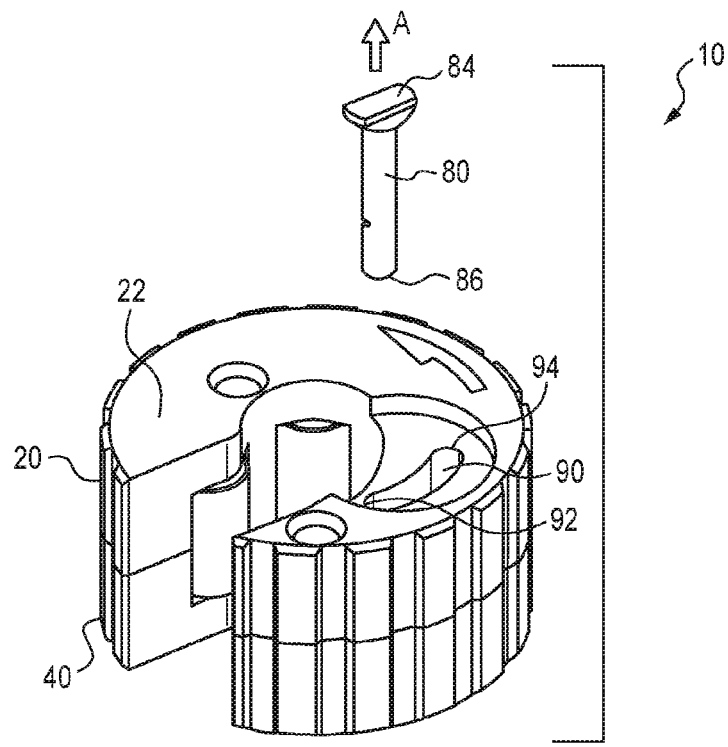
FIGS. 3-8 illustrate replacement of a cutting wheel of the cutter depicted in FIGS. 1-2.
Figure 4:
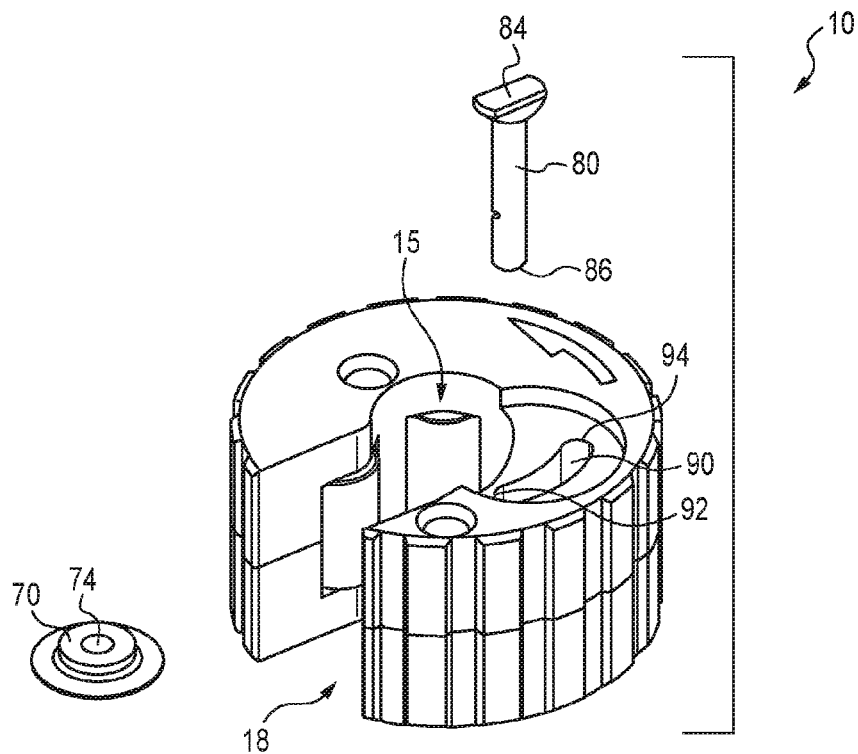

FIGS. 3 and 4 illustrate the cutter 10 and replacement of its cutting wheel 70. In order to replace the wheel 70 (not shown in FIG. 3), a user removes the axle pin 80 from the axle slot 90 by pulling the axle 80 from slot 90 and generally away from the face 22 of the housing portion 20 such as in the direction of arrow A. After removal of the axle pin 80 from the wheel 70, which can be accomplished by removal of the axle pin 80 from the slot 90, the cutting wheel 70 is separable from the housing portions 20, 40 and can be removed through either or both of the work region 15 and/or the access port 18.

Figure 5:
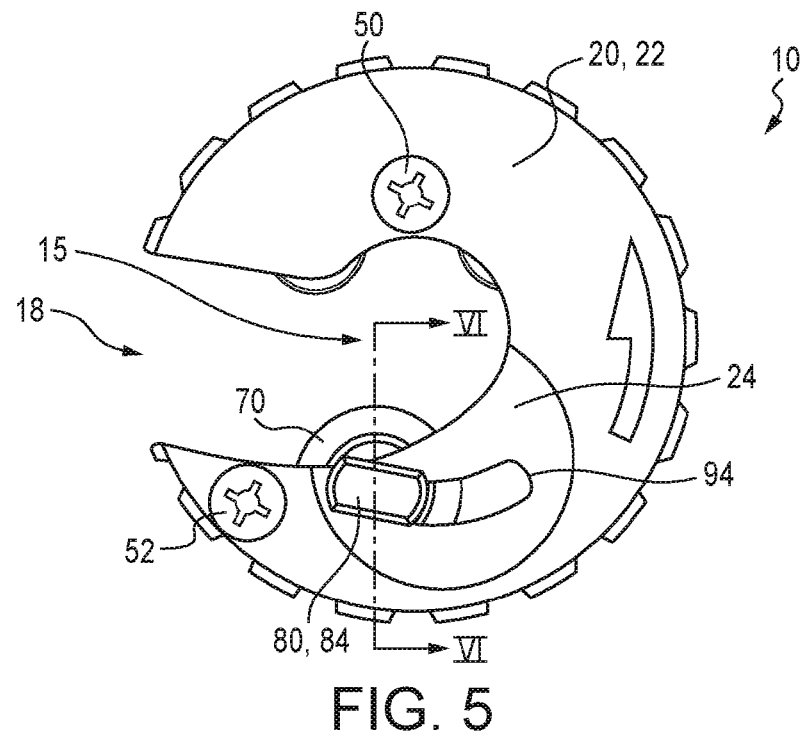

Upon obtaining a new or replacement cutting wheel, the operations previously described in association with FIGS. 3 and 4 are performed in reverse. Thus, the new cutting wheel 70 is inserted into the work region 15 and partially within a receiving region defined in the housing so that the bore 74 of the wheel 70 is aligned with and accessible via the slot 90. The axle pin 80 is then inserted into the slot 90 and through the bore 74 of the cutting wheel 70. At this stage in the wheel replacement, the axle pin 80 is generally positioned at one end of the slot 90 as shown in FIG. 5. This end of the slot 90 is shown in FIGS. 3 and 4 as slot end 92. At this stage of wheel replacement, the position of the axle at this slot end is referred to herein as an interim position. As described in greater detail herein, upon incorporation of the wheel 70 in the housing, the axle pin 80 is positioned toward the other slot end 94, opposite from the interim end 92. Upon final installation of the wheel 70 in the housing, the axle pin 80 is returned to the previous slot end 92. This is described in greater detail herein.

Figure 6:
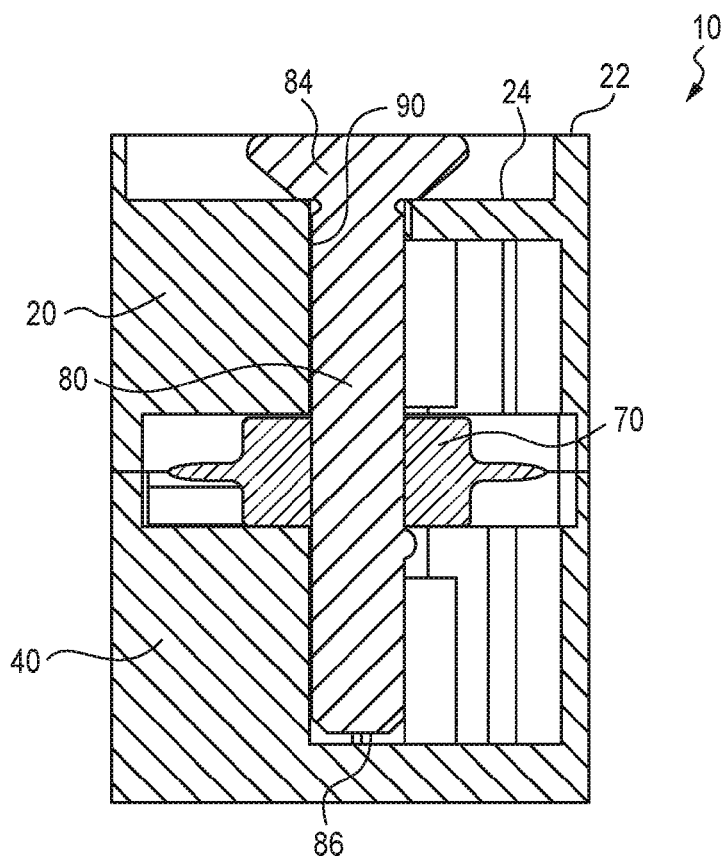

FIGS. 5 and 6 illustrate the axle pin 80 and its associated cutting wheel 70, located at the interim position proximate the slot end 92 (best shown in FIGS. 3 and 4). In certain embodiments of the present subject matter, one of the housing portions such as the first portion 20 defines a recessed region 24 along the outer face 22. The depth of the recessed region 24 is generally such that upon full insertion of the axle pin 80 into the slot 90, the axle 80 and its head 84 do not project beyond the outer face 22. However, it will be appreciated that the present subject matter is not limited to this configuration and includes other arrangements.

Figure 7:
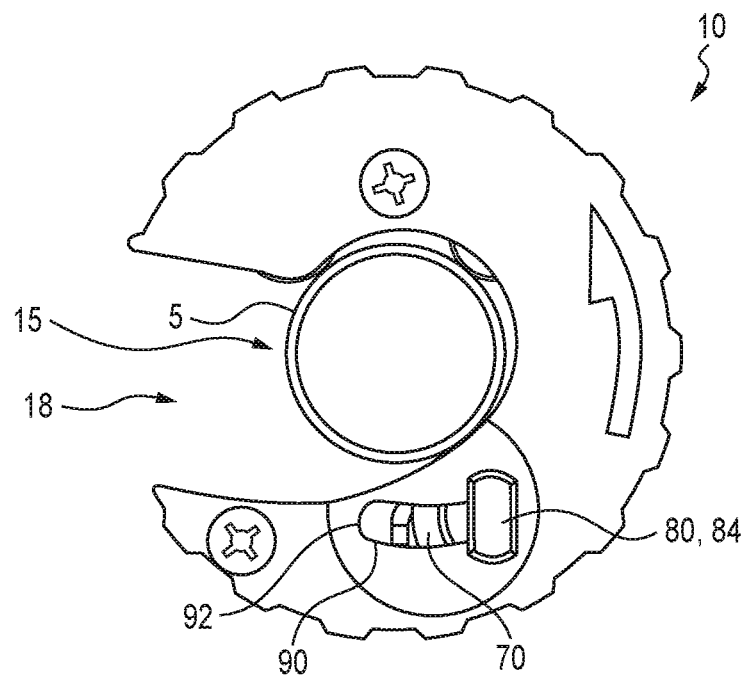

Upon initial or temporary placement of the wheel 70 and axle pin 80 at the interim position near or adjacent to the slot end 92, the wheel 70 and axle 80 are displaced toward their secondary position as shown in FIG. 7. In this secondary position, the axle pin 80 is located near, proximate, and/or adjacent to the end 94 of the slot 90. Displacement of the axle pin 80 and the wheel 70 from the interim position at slot end 92 to the secondary position at slot end 94 can be facilitated by urging a workpiece 5 as shown in FIG. 7 through the access port 18 and into the work region 15. Contact between the cutting wheel 70 and the workpiece 5 causes movement of the wheel 70 and the axle pin 80 toward the slot end 94. As shown in the referenced figures, the slot end 92 is closer to the access port 18 than the slot end 94. And the interim position of the wheel 70 and axle pin 80 is closer to the access port 18 than the secondary position of the wheel and axle.

In many embodiments, upon urging the cutting wheel 70 and axle pin 80 from the slot end 92 toward the slot end 94, the axle 80 rotates about its axis such that the enlarged head 84 of the axle pin 80 changes its position relative to the slot 90, as best shown by comparing the position of the head 84 in FIGS. 7 and 5. Upon rotation of the axle pin 80 about its longitudinal axis to the position shown in FIG. 7, the position of the enlarged head 84 serves to further engage the axle 80 and wheel 70 within the housing.

Figure 8:
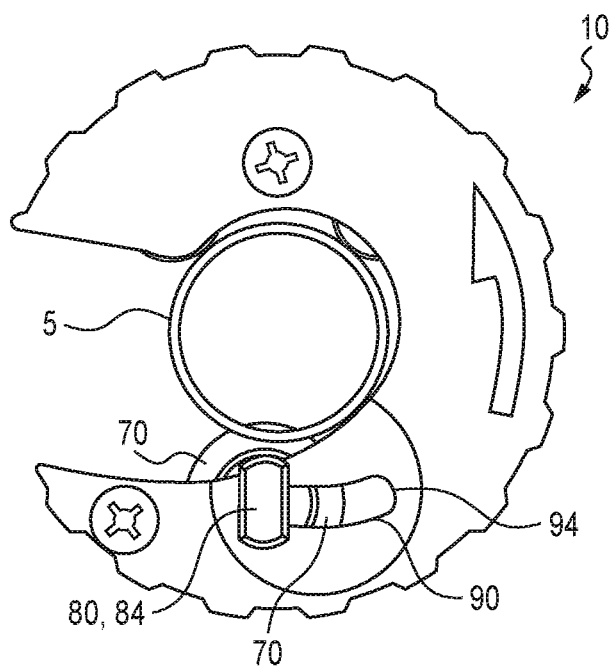

During use, i.e. cutting, of the tool 10, the axle pin 80 and cutting wheel 70 typically move back to the slot end 92. This is shown in FIG. 8. Thus, after final installation of a wheel 70, the axle and wheel are positioned in their use position proximate the slot end 92. The previously noted spring 71 can be used to urge the wheel 70 toward the slot end 92.

In many embodiments of the present subject matter cutters, the slots defined in the housing such as for example slot 90, are arcuate in shape. That is, the slot extends along an arc or curve between its ends, e.g., ends 92 and 94. However, it will be appreciated that the present subject matter includes the use of non-arcuate slots such as linear straight slots or stepped slots. In many embodiments, the slot 90 extends between and is accessible along the first and second faces of the housing, i.e., 22 and 42. However, the present subject matter includes cutters in which the slot is accessible on only one face.

The tubing cutters of the present subject matter are constructed of conventional materials known and/or used in the field of tools. The housing components can be formed from suitable polymeric materials and the cutting wheel is typically steel or other metal(s). The tubing cutters and their associated work regions and access ports are appropriately sized to accommodate tubing having an outer diameter within a range of from about ⅛ inch (3.175 mm) to about 1.5 inch (38.1 mm). However, the present subject matter includes sizing and configuring the cutters to accommodate tubes, pipes, conduits, or other workpieces smaller or larger than the noted representative range.

A significant advantage of the tubing cutters described herein is the ease in which a cutting wheel can be replaced. Many other C-type tubing cutters are known in which the cutter housing must be at least partially disassembled in order to replace the wheel. Other C-type tubing cutters are known in which one or more tools are needed in order to replace the cutting wheel. The tubing cutters described herein feature a cutting wheel that can be quickly and easily replaced without tools and without disassembly of the housing.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A handheld cutting tool comprising:
   a housing including a first outer face and a second outer face oppositely directed from the first outer face, the housing defining a work region for receiving a workpiece to be cut, the housing defining an axle slot, the axle slot accessible along only one of the first and second outer faces, the axle slot extending between a first slot end and a second slot end, the second slot end being opposite the first slot end;
   at least one roller rotatably supported in the housing and accessible in the work region; and
   a cutting wheel and axle assembly removably retained within the housing, the axle being disposed in the axle slot and positionable between the first slot end and the second slot end;
   wherein the housing further defines a recessed region along the first outer face, within which the axle slot is defined;
   wherein the cutting wheel and axle assembly includes an axle pin, the axle pin defining an enlarged head end and an opposite distal end, the axle pin disposed in the axle slot such that the head end is disposed within the recessed region.

2. The cutting tool of claim 1 wherein the head end of the axle pin does not extend beyond the first outer face defined by the housing.

3. The cutting tool of claim 1 wherein the axle slot is arcuate in shape and extends between the first slot end and the second slot end.

4. A handheld cutting tool comprising:
   a housing defining a first outer face, a second outer face oppositely directed from the first face, a work region for receiving a workpiece to be cut and an axle slot, wherein the slot is accessible along only one of the first and second outer faces;
   at least one roller rotatably supported in the housing and accessible in the work region; and
   a cutting wheel and axle assembly removably retained within the housing, the cutting wheel and axle assembly including an axle pin, the axle pin defining an enlarged head end and an opposite distal end, the axle pin being disposed in the slot and positionable between a first end of the slot and a second end of the slot, opposite the first end.

5. The cutting tool of claim 4 wherein the housing also defines an access port providing radial entry to the work region.

6. The cutting tool of claim 4 wherein the at least one roller includes two rollers, each of which is rotatably supported in the housing and accessible in the work region.

7. The cutting tool of claim 4 wherein the axle slot is arcuate in shape between the first end of the slot and the second end of the slot.

8. The cutting tool of claim 4 wherein the housing also defines a circumferential wall extending between the first outer face and the second outer face.

9. The cutting tool of claim 8 wherein the housing further defines a recessed region along the first face, within which the axle slot is defined.

10. The cutting tool of claim 9 wherein the axle slot is arcuate in shape, and the axle slot extends along an arc or curve between the first slot end and the second slot end, the enlarged head end of the axle pin is disposed within the recessed region.

11. The cutting tool of claim 10 wherein the head end of the axle pin does not extend beyond the first outer face defined by the housing.

12. A method of replacing a cutting wheel of a handheld cutting tool including (i) a housing having first and second oppositely directed outer faces, the housing defining a work region for receiving a workpiece to be cut, the housing defining an axle slot, the axle slot accessible along only one of the first and second outer faces, the housing further defining an access port providing radial access to the work region and the axle slot extending between a first end proximate to the access port and a second end opposite the first end, and (ii) a cutting wheel and an axle disposed in the cutting wheel, the cutting wheel and the axle removably retained within the housing, the axle being disposed in the slot and positionable between a first end of the slot and a second end of the slot, opposite the first end, the method comprising:

removing the axle from the cutting wheel and the slot, thereby enabling separation of the cutting wheel from the housing;

removing the cutting wheel from the housing;

positioning another cutting wheel within the housing, the other wheel defining a central bore sized to receive the axle, whereby the other wheel is positioned within the housing such that the bore is accessible through the slot; and inserting the axle into the slot and the bore of the other cutting wheel to thereby retain the other cutting wheel within the housing, whereby during the inserting the axle into the slot, the axle is positioned proximate the first end of the slot.

13. The method of claim 12 further comprising:

positioning the axle and the other cutting wheel from the first end of the slot to the second end of the slot.

14. The method of claim 13 whereby the positioning of the axle and the other cutting wheel is performed by urging a workpiece into the access port toward the work region and contacting the workpiece with the other cutting wheel.

15. The method of claim 13 whereby during the positioning of the axle and the other cutting wheel from the first end of the slot to the second end of the slot, the axle rotates at least partially about a longitudinal axis of the axle.

16. The method of claim 13 further comprising:

positioning the axle and the other cutting wheel from the second end of the slot to the first end of the slot.

* * * * *